(12) United States Patent
Crivello

(10) Patent No.: US 6,210,790 B1
(45) Date of Patent: Apr. 3, 2001

(54) GLASS-LIKE COMPOSITES COMPRISING A SURFACE-MODIFIED COLLOIDAL SILICA AND METHOD OF MAKING THEREOF

(75) Inventor: James Vincent Crivello, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/116,094

(22) Filed: Jul. 15, 1998

(51) Int. Cl.[7] ........................................ B32B 5/16
(52) U.S. Cl. ..................... 428/325; 428/331; 428/404; 428/407
(58) Field of Search ..................... 428/403, 404, 428/323, 325, 331, 407

(56) References Cited

U.S. PATENT DOCUMENTS

| | | | | |
|---|---|---|---|---|
| 4,330,446 | * | 5/1982 | Miyosawa ............................... | 523/409 |
| 4,355,135 | * | 10/1982 | January ................................. | 524/767 |
| 4,455,205 | | 6/1984 | Olson et al. ....................... | 204/159.13 |
| 4,478,876 | | 10/1984 | Chung ................................... | 427/54.1 |
| 4,482,656 | * | 11/1984 | Nguyen et al. ....................... | 523/112 |
| 4,486,504 | | 12/1984 | Chung ................................... | 428/412 |
| 4,491,508 | | 1/1985 | Olson et al. ....................... | 204/159.13 |
| 4,526,910 | * | 7/1985 | Das et al. ............................... | 523/220 |
| 4,528,324 | | 7/1985 | Chung et al. ........................... | 524/863 |
| 5,075,348 | | 12/1991 | Revis et al. ............................. | 522/84 |
| 5,086,087 | * | 2/1992 | Misev ..................................... | 522/84 |
| 5,102,695 | * | 4/1992 | Guest et al. ........................... | 427/164 |
| 5,104,929 | * | 4/1992 | Bilkadi ................................... | 524/847 |
| 5,126,394 | * | 6/1992 | Revis et al. ........................... | 524/548 |
| 5,149,839 | | 9/1992 | Waketa et al. ......................... | 556/413 |
| 5,242,719 | | 9/1993 | Medford et al. ....................... | 427/515 |
| 5,466,491 | | 11/1995 | Factor et al. ........................... | 427/515 |
| 5,468,789 | | 11/1995 | Lewis et al. ............................ | 524/99 |
| 5,683,501 | * | 11/1997 | Tomihisa et al. ..................... | 106/491 |
| 5,708,048 | | 1/1998 | Medford et al. ....................... | 522/64 |
| 5,709,715 | * | 1/1998 | Guidotti et al. ..................... | 8/115.51 |
| 5,739,181 | | 4/1998 | Khudyakov et al. ................. | 523/213 |
| 5,858,526 | * | 1/1999 | Floch et al. ........................... | 428/327 |

OTHER PUBLICATIONS

Crivello, J., & Mao, Z., "Preparation and Cationic Photopolymerization of Organic–Inorganic Hybrid Matrixes," Chem. Mater., vol. 9, pp. 1562–1569, 1997.

\* cited by examiner

*Primary Examiner*—H. Thi Le
(74) *Attorney, Agent, or Firm*—Heslin & Rothenberg, P.C.

(57) ABSTRACT

Transparent, hard, abrasion-resistant polymer composites, composed of a highly crosslinked silica-reinforced epoxy or 1-alkenyl resin wherein silica particles are covalently bonded to the resin. A method for producing such composites by preparing an epoxy- or 1-alkenyl ether-functional colloidal silica includes mixing a multifunctional epoxy- or 1-alkenylether monomer and a polymerization initiator; applying the mixture to a substrate and curing, by exposure to heat or radiation. A surface-modified colloidal silica containing epoxy- or 1-alkenylether functionality covalently bonded to a surface of a finely divided silica particle, and a process for the preparation thereof is disclosed. A photocurable composition which is a mixture of an epoxy- or 1-alkenyl ether-functional silica and a multifunctional epoxy- or 1-alkenyl ether monomer is also disclosed.

19 Claims, No Drawings

GLASS-LIKE COMPOSITES COMPRISING A SURFACE-MODIFIED COLLOIDAL SILICA AND METHOD OF MAKING THEREOF

FIELD OF THE INVENTION

The invention relates to modified silica-polymer composites and methods for their preparation.

BACKGROUND OF THE INVENTION

In many applications, the formability, flexibility, lower processing temperatures, resistance to breakage and lighter weight of transparent plastics are features which make these materials attractive as substitutes for glass. However, plastics also have inherent drawbacks in comparison to glass. For example, poor abrasion resistance causes transparent plastics to scratch and haze, making them unsuited for glazing.

One means of making a plastic with glass-like properties has been to utilize a matrix of a highly crosslinked polymer with a finely divided silica. These materials are intrinsically hard and have been applied as coatings to the surface of plastic articles to improve abrasion resistance. Such abrasion resistant hardcoat compositions based on the photoinduced free radical polymerizations of multifunctional acrylates have been described recently in U.S. Pat. No. 5,708,048 and are also commercially available.

UV-cured plastics can be processed at higher rates and consume far less energy than thermally-cured systems. In addition, these materials can be applied to even thin plastics with low glass transition temperatures without causing distortion and warping usually encountered in processing at higher temperatures. In these compositions, silyl acrylate coupling agents undergo hydrolysis by water present in the aqueous dispersion of colloidal silica. By this reaction, the alkoxy groups are replaced by hydroxy groups which hydrogen bond to, or form covalent bonds with, the hydroxy groups present on the surface of the silica particle.

However, these materials possess drawbacks that diminish their attractiveness. The sensitivity of free radical polymerizations to inhibition by oxygen often causes a soft layer to be formed at the exposed surface. On the other hand, it is difficult to stabilize these materials against adventitious free radical polymerization in the absence of oxygen. As a result, the materials have relatively short shelf lives and tend to gel on standing.

Cationic photopolymerizations have the advantage that they display no appreciable oxygen inhibition and in addition, using this approach, a wide variety of different monomer systems, including epoxies, vinyl ethers, and oxetanes may be used. However, until now, it has not been possible to prepare silica-polymer composites having glass-like properties by cationic photopolymerization. There are several reasons for this. First, cationic photoinitiators are not useful with acrylate monomers. Second, a process for preparing composites based on acrylate polymers entails surface modification of colloidal silica with acrylate groups by hydrolysis and condensation of acrylate-functional alkoxysilane coupling agents in order to incorporate the silica into the polymer matrix. However, conditions required for the hydrolysis have prevented use of cationically polymerized epoxies: acid-catalyzed hydrolysis results in opening of the epoxy ring while use of basic catalysts causes inhibition of the cationic polymerization.

It is therefore an objective of this invention to provide a polymer composite which possesses glass-like properties. It is a further objective to retain the advantages of UV curing: a system which is solvent-free, low energy, and cures rapidly at low temperatures. It is still a further objective to overcome the difficulties inherent in using free radical initiators for polymerization.

SUMMARY OF THE INVENTION

The present invention achieves these objectives and provides for a surface-modified colloidal silica containing epoxy- or 1-alkenylether functionality covalently bonded to a surface of a finely divided silica particle, and a process for its preparation which incorporates the steps of mixing a colloidal silica, an epoxy- or 1-alkenyl ether-functional-trialkoxysilane and an ion-exchange resin and removing the ion-exchange resin. The functionality covalently bonded to the surface of the silica particle is a residue derived from an alkoxysilane chosen from the group consisting of:

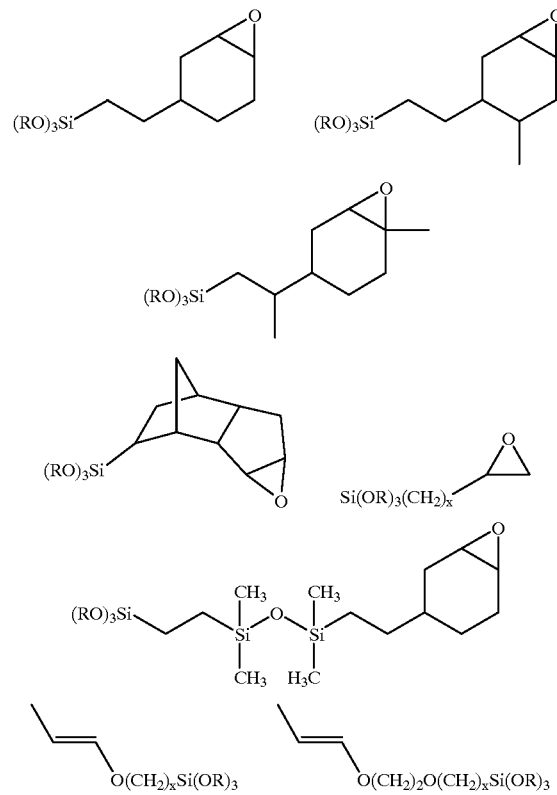

wherein x=1 to 8. The colloidal silica may be in the form of an acidic aqueous dispersion.

In another embodiment, the invention provides for a photocurable composition comprising an epoxy- or 1-alkenyl ether-functional silica and a multifunctional epoxy- or 1-alkenyl ether monomer. Preferred monomers are 1,2-epoxy octane, 1,2-epoxydecane, 1,2,13,14-tetradecane diepoxide, 1,2,7,8-octane diepoxide, epichlorohydrin, limonene dioxide, α-pinene oxide, dicyclo-pentadiene dioxide, 4-vinylcyclohexene dioxide, 3,4-epoxycyclohexylmethyl-3',4'-epoxycyclohexenecarboxylate, cyclopentene oxide, cyclohexene oxide, cycloheptene oxide, cyclooctene oxide, 1,2,5,6-cyclooctadiene dioxide; butanediol diglycidyl ether, bisphenol-A-diglycidyl ether, bisphenol-A-extended glycidyl ethers, phenol-formaldehyde glycidyl ethers, cresol-formaldehyde glycidyl ethers; diglycidyl phthalate; epoxidized linseed oil, epoxidized soybean oil, epoxidized safflower oil, epoxidized sunflower oil, epoxidized rapeseed oil, epoxidized canola oil; silicone epoxy resins; epoxidized polybutadiene, epoxidized polyisoprene and epoxidized polystyrene-co-butadiene.

In yet another embodiment, a polymer composite is provided which is composed of a highly cross-linked silica-reinforced epoxy or 1-alkenyl resin wherein silica particles are covalently bonded to the resin. In still another embodiment, the present invention provides a method for producing composites by preparing an epoxy- or 1-alkenyl ether-functional colloidal silica; adding a multifunctional epoxy- or 1-alkenyl ether monomer; adding a polymerization initiator; applying the mixture to a substrate and curing, by exposure to heat or radiation.

DETAILED DESCRIPTION OF THE INVENTION

The compositions of the invention contain a modified colloidal silica having epoxy or 1-alkenyl groups attached to the surface of the particle. In one aspect, the invention relates to these surface-modified silicas. In another aspect, the invention relates to a combination of the modified silica with a multifunctional epoxy or 1-alkenyl ether monomer. In yet another aspect, the invention relates to having the modified silica incorporated as part of a crosslinked polymer network based on epoxy or 1-alkenyl ether monomers.

The term colloidal silica includes silica in the form of a colloidal dispersion and is intended to represent a wide variety of finely divided $SiO_2$ forms which can be utilized to form the compositions of the invention. Further description can be found in U.S. Pat. No. 4,027,073, the disclosure of which is incorporated herein by reference.

Colloidal silica is a dispersion of submicron-sized silica ($SiO_2$) particles in an aqueous or other solvent medium. Dispersions of colloidal silica are available from chemical manufacturers such as DuPont and Nalco Chemical Company. Colloidal silica is available in either acidic or basic form. For purposes of the present invention, it is preferable that the acid form be utilized. Alkaline colloidal silica may be converted to acidic colloidal silica by the addition of acids such as HCl or $H_2SO_4$ with high agitation.

Nalco 1034, available from Nalco Chemical Company, is an example of a colloidal silica used in the compositions of the invention. NALCO 1034 is a high-purity, acidic aqueous colloidal silica dispersion in water, having a mean particle size of 20 nanometers (nm), and a low $Na_2O$ content, a pH of approximately 3.1 and an $SiO_2$ content of approximately 34% by weight. In the examples below, parts by weight of the colloidal silica includes an aqueous component of the dispersion. Thus, for example, in 520 grams of NALCO-1034, colloidal silica represents, approximately, 117 grams of $SiO_2$ by weight. Aqueous dispersion is a convenient way of handling the colloidal silica and does not form a necessary part of the compositions of the present invention. However, because water is required for hydrolysis of the alkoxy silane, some water must be added to the system when non-aqueous colloidal silica is used.

According to an embodiment of the present invention, modified colloidal silica is made by blending the aqueous colloidal silica with a trialkoxy silane coupling agent. In one blending procedure, trialkoxy silane is hydrolyzed in the presence of aqueous colloidal silica and a water-miscible alcohol. In another procedure, the aqueous colloidal silica is added to the silane which has been hydrolyzed in aqueous alcohol. Suitable water miscible alcohols include, for example, methanol, ethanol, propanol, isopropanol, t-butanol, n-butanol and ether alcohols, such as ethoxyethanol, butoxyethanol, and methoxypropanol. Preferably, the water miscible alcohol comprises less than 50% of the resulting mixture of colloidal silica and trialkoxysilane. Only sufficient water miscible alcohol need be added in order to azeotropically remove the water which is present.

In one embodiment, colloidal silica is modified to contain 1-alkenylether functionality at the surface. These materials are prepared by a combination of a colloidal silica dispersion with a 1-alkenylether-functional trialkoxysilane coupling agent. Preferred coupling agents for the incorporation of 1-1-alkenylether-functionality are shown below.

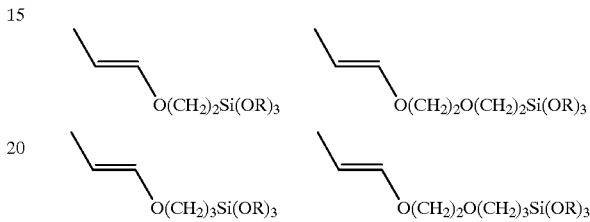

where R is methyl or ethyl. Most preferred is 1-(1-propenoxy)-2-((2-trimethoxysilyl)ethoxy)-ethane.

The preferred trimethoxysilyl 1-propenyl ether was prepared by the procedure described in Crivello, J. V. & Mao, Z.," Chem. Matter., pg. 1554, 1997. Ethylene glycol monovinyl ether was condensed with allyl bromide under basic conditions in the presence of a phase-transfer catalyst. Subsequently, the resulting allyl ether was isomerized in the presence of tris(triphenylphosphine)ruthenium-(II) dichloride to give the desired 1-allyloxy-2-(vinyloxy)-ethane. Chemoselective hydrosilation of this latter compound with trimethoxysilane in the presence of a catalytic amount of tris(triphenylphosphine) rhodium(I) chloride afforded 1-(1-propenoxy)-2(2-trimethoxysilylethoxy)ethane in good yield.

In another embodiment of the invention, colloidal silica is modified by combining with an epoxy-functional trialkoxysilane. These materials are prepared by a combination of colloidal silica dispersion with an epoxy-functional trialkoxysilane coupling agent. Suitable epoxy trialkoxysilanes are shown below.

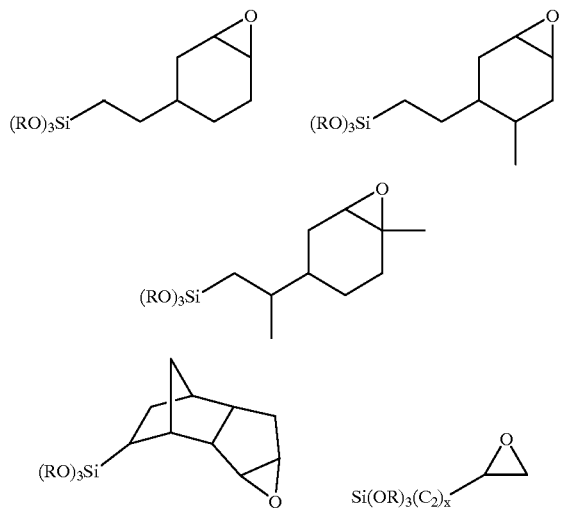

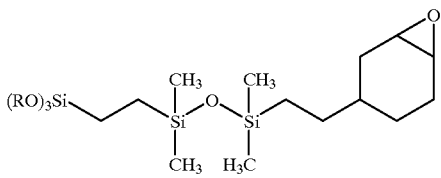

wherein x=1 to 8 and R is methyl or ethyl.

Preferred epoxy coupling agents are: 2-(3,4-epoxycyclohexyl) ethyltrimethoxysilane, and 3-glycidoxypropyl trimethoxysilane; these are available from Hüls America. Other preferred epoxy functional silanes are: 5,6-epoxyhexyltrimethoxysilane and 1,1,3,3-tetramethyl-1-(2-trimethoxysilyl)ethyl-3-(2-(3,4, epoxy) cyclohexyl)ethyl disiloxane) I. The preparation of I is described in Crivello, J. V. and Bi, D., *J. Polymer Sci., Polym. Chem.* Ed., pg. 3121, 1993.

The hydrolysis and condensation of the trialkoxysilane is catalyzed by an ion-exchange resin in bead form. The use of a quaternary ammonium ion exchange resin is advantageous for two reasons. First, acid hydrolysis catalysts are not useful for the preparation of these materials since epoxy groups undergo spontaneous ring-opening reactions with acids. Second, although epoxide groups do not directly react with inorganic bases, these bases are strong inhibitors for photoinduced cationic polymerizations, and it is difficult or impossible to remove conventional basic catalysts at the end of the reaction. However, a catalyst in the form of a highly crosslinked bead is easily recovered from the reaction mixture by simple filtration. Alternatively, the reaction may be carried out over a fixed bed of the resin. A preferred ion exchange resin for the preparation of epoxy modified colloidal silica to be used in cationic photopolymerization is a quaternary ammonium-functional resin in the chloride form.

Highly crossed-linked styrene divinyl benzene ion resins are well known in the art. The resins are classified as strongly basic, strongly acidic, weakly basic, or weakly acidic. Strongly basic resins contain quaternary ammonium; strongly acidic resins contain sulfonic acid groups. Exemplary styrene-divinyl benzene resins useful in the practice of the invention are Amberlite® resins, available from the Rohm & Haas Company. Useful ion-exchange resins may also be obtained from Sybron Chemicals, Dow Chemicals, Porolite, Thermax, Ltd. and Resintech, Inc.

The hydrolysis of the alkoxysilane and condensation with the surface silanol groups can be accomplished by combining the aqueous colloidal silica and the alkoxysilane coupling agent and stirring until hydrolysis has been effected. This can be accomplished at ambient conditions, or by heating the mixture. In instances where a colloidal silica dispersed in an alcohol is employed, water can be added in an amount of 0.05 parts to about 5 parts, based on the total weight.

In preparing the modified colloidal silica of the present invention, an azeotropic mixture of water and alcohol can be distilled from the mixture. In instances where no alcohol is utilized in the initial hydrolysis mixture, sufficient alcohol can be added to facilitate the removal of water by distillation. Other solvents, for example, toluene or other aromatic solvents, can be added to facilitate the removal of water.

The photopolymerizable compositions of the invention are prepared by the combination of the surface modified colloidal silica of the present invention with a multifunctional monomer. In one embodiment, the monomer contains epoxy functionality; and in another embodiment, 1-alkenylether functionality. The monomers selected should be very highly reactive, such as the biscycloaliphatic epoxy monomers, and must possess no significant UV absorption.

Where the composition contains epoxy functionality, one or more multi-functional epoxy monomers may be used in the practice of the invention. This includes expoxidized alkenes such as 1,2-epoxy octane, 1,2-epoxydecane, 1,2,13, 14-tetradecane dipoxide, 1,2,7,8-octane diepoxide; epichlorohydrin; alicyclic epoxides such as limonene dioxide, α-pinene oxide, dicyclopentadiene dioxide, 4-vinylcyclohexene dioxide, 3,4-epoxycyclohexylmethyl-3', 4'-epoxycyclohexenecarboxylate, cyclohexene oxide, cyclopentene oxide, cycloheptene oxide, cyclooctene oxide, 1,2, 5,6-cyclooctadiene dioxide; glycidyl ethers such as butanediol diglycidyl ether, bisphenol-A-diglycidyl ether, bisphenol-A-extended glycidyl ethers, phenol-formaldehyde glycidyl ethers (epoxy novolacs), and cresol-formaldehyde glycidyl ethers (epoxy cresol novolacs); epoxy ethers such as diglycidyl phthalate; epoxidized vegetable oils such as epoxidized linseed, soybean, safflower, sunflower, rapeseed, canola oil; silicone epoxy resins; epoxidized polymers such as epoxidized polybutadiene, epoxidized polyisoprene and epoxidized polystyrene-co-butadiene. Preferred epoxy-functional monomers are limonene dioxide and 3,4-epoxy cyclohexylmethyl-3,4-epoxycyclohexane carboxylate, available from the SEM Corporation, and Ciba Geigy Corporation, respectively, and the silicone-containing epoxy monomer, 1,3-di-2-(3,4-epoxy cyclohexyl)ethyl-1,1,3,3-tetramethyldisiloxane. The preparation of the silicone-containing epoxy monomer is described in Crivello, J. V. and Lee, J. L., *J. Polymer Sci., Polym. Chem.* Ed., pg. 479, 1990.

Where the composition contains 1-alkenyl ether functionality, the silica is modified with a vinyl or propenyl ether, which is then diluted with a multifunctional vinyl or propenyl ether. The vinyl ether-based systems cure very rapidly. One or more mono- or multi-functional vinyl or propenyl ethers may be used. Examples of such compounds useful in the present invention are: n-propyl vinyl ether, n-butyl vinyl ether, isobutyl vinyl ether, ethylene glycol divinyl ether, diethylene glycol divinyl ether, triethylene glycol divinyl ether, 1,4-cyclohexanediol divinyl ether, trimethylolpropane trivinyl ether, pentaerythritol tetravinyl ether, polyethylene glycol divinyl ether, n-octyl 1-propenyl ether, n-decyl 1-propenyl ether, dodecyl 1-propenyl ether, ethylene glycol di-1-propenyl ether, diethylene glycol di-1-propenyl ether, triethylene glycol di-1-propenyl ether, 1,4-cyclohexandiol di-1-propenyl ether, trimethylolpropane tri-1-propenyl ether, pentaerythritol tetra-1-propenyl ether, and polyethylene glycol di-1-propenyl ether. Most preferred are 1,2-dipropen-oxyethane and diethyleneglycol-di-1-propenoxy ether.

The curable compositions of the invention are prepared by combining modified silica with a multifunctional monomer. Removal of the solvent yields colorless, transparent, or very slightly turbid, highly viscous products, which display thixotropic characteristics in some cases. This display of thixotropy suggests good interaction of the modified silica with the difunctional monomers. Under the slight shear produced by stirring, the initially viscous, gel-like compositions are very fluid and are easily spread as thin films.

The compositions of the invention, comprising modified silica and a difunctional alkenyl ether or epoxy monomer, may be polymerized by the application of heat or ultraviolet or electron beam radiation. Initiators useful for photopolymerization of epoxy, 1-propenyl ether and vinyl ether compounds are diaryliodonium salts, triarylsulfonium salts and ferrocenium salts.

In a preferred embodiment, cationic photoinitiators are used. These include: diaryliodonium salts, triarylsulfonium salts, diaryliodosonium salts, dialkyl(hydroxydialkylphenyl) sulfonium salts and ferrocenium salts. Such onium salts may be modified by the attachment of alkyl, alkoxy, siloxy and the like groups without decreasing their utility. A preferred initiator is (4-n-decyloxyphenyl)phenyliodonium hexafluoroantimonate, sold by Sartomer Chemical as Sarcat CD-1012. Typically, the photoinitiator is employed in concentrations ranging from 0.1 to 10% by weight based on the monomer or monomers. The photoinitiator should be soluble in the monomer or mixture of monomers, but exhibit minimal solubility in the suspending medium.

Photosensitizers may also be employed to change or broaden the wavelength of sensitivity. More specifically, by employing such photosensitizers, it is possible to accelerate the polymerization and hence, the formation of the microbeads. In addition, such photosensitizers make it possible to use either long wavelength UV or visible light to carry out the photopolymerizations. Among the many types of useful photosensitizers which may be used are: anthracene, phenanthracene, pyrene, perylene, thioxanthone, 2-chlorothioxanthone, 2-isopropylthioxanthone, anthraquinone, camphor-quinone, 1,4-diphenylbutadiyne, acridine orange, acridine red, hematoporphrin, and phosphine R. The choice of the photosensitizer and its concentration will depend on the specific light source and photoinitiators which are used. Typically, the photosensitizer is employed in a concentration ranging from 10–50%, based on the photoinitiator.

The photocurable compositions of the present invention may also contain additives to enhance usefulness, including leveling agents, various flatting agents, surface active agents, thixotropic agents, UV light stabilizers and dyes. All of these additives, and the use thereof, are well known in the art and do not require extensive discussion. Therefore, only a limited number have been referred to, it being understood that any of these compounds may be used as long as it does not deleteriously affect either the curing or the transparency of the composite.

The compositions will adhere to substantially all solid substrates. Substrates particularly contemplated are glass and transparent and nontransparent plastics. More particularly, these plastics are synthetic organic polymeric substrates such as acrylic polymers, polycarbonates, polyesters, polyamides, polyimides, acrylonitrile-styrene copolymers, styrene-acrylonitrile-butadiene copolymers, polyvinyl chloride, butyrates, polyethylene, polyolefins, epoxy resins and epoxy-fiberglass composites. Other solid substrates contemplated herein include metal, wood, painted surfaces, leather, ceramics, textiles, and paper. The cured composites of the invention, being hard, brittle, optically transparent films, have particular utility as abrasion-resistant hardcoats for plastics, waveguides for electronic applications, couplers or coatings for optical fibers and for other applications requiring transparency, high mechanical strength, and high rate of cure.

EXAMPLES

Example 1

Preparation of Epoxy- or 1-Alkenyl-functional Silica

A 50 mL round-bottom flask was fitted with a magnetic stirrer and a condenser, and charged with 5.0 grams of NALCO-1034 silica, 1.0 grams of a trialkoxysilane coupling agent, and 10 grams of isopropanol. The resulting very slightly turbid suspension was stirred and heated at 60° C. for two hours. Amberlite® IRA-904 weakly acidic ion exchange resin (100–120 mg, used as received) was added, and a suspension was stirred and heated at 60° C. for an additional two hours. The solution was cooled to room temperature, and filtered through a plug of glass wool to remove the ion-exchange resin.

Trialkoxysilanes used were: 2-(3,4-epoxycyclohexyl) ethyl trimethoxysilane, 3-glycidoxypropyl trimethoxysilane, 5,6-epoxyhexyl trimethoxysilane, 1,1,3,3-tetramethyl-1-(2-trimethoxysilyl)ethyl-3-(2-(3,4, epoxy)cyclohexyl)ethyl and 1-(1-propenoxy)-2-(2-(trimethoxysilyl) ethoxy)-ethane.

Example 2

Preparation of Modified Silica-Multifunctional Monomer Compositions

The colorless or slightly turbid solution of the modified silica was combined with 4.0 grams of multifunctional monomers and 14 grams of isopropanol. Removal of the solvent under reduced pressure yielded a colorless transparent or very slightly turbid solution or thixotropic product.

Compositions were prepared using five different multifunctional monomers: limonene dioxide, 3,4-epoxycyclohexylmethyl-3,4-epoxy cyclohexane carboxylate, 1,3-di-2-(3,4-epoxy cyclohexyl)ethyl-1,1,3,3-tetramethyldisiloxane, 1,2 dipropenoxyethane and diethyleneglycol di-1-propenoxy ether.

The shelf life of the resulting products was greater than six months.

Example 3

Thin Film Polymerizations

Thin films of the modified silica-multifunctional monomer compositions containing 2.0 weight percent of (4-n-decyloxyphenyl)phenyliodonium hexafluoroantimonate photoinitiator were spread on glass or steel panels and irradiated with a 200 watt medium-pressure mercury arc lamp mounted at a distance of 12 cm from the sample. Hard, brittle, optically transparent films were obtained after 1–5 second irradiation.

Example 4

Synthesis of 5,6-Epoxyhexyltrimethoxysilane

In a 100 mL round-bottom flask were placed 8.5 mL of 5,6-epoxy-1-hexene (0.1 moles), 1.5 equivalents of trimethoxysilane (17 mL), 30 mL of toluene dried by refluxing with sodium benzophenone ketyl, and 3 mg of tris (triphenylphosphine)rhodium (I) chloride. The resulting light purple solution was stirred and heated at 80° C. for 12 hours. The solvent was removed under reduced pressure, and the resulting oil subjected to fractional vacuum distillation. 5,6-Epoxyhexyltrimethoxysilane was obtained (13.5 g, 61% yield) as a colorless liquid.

Example 5

RTIR Analysis

The course of the photopolymerization of the modified silica-monomer mixtures may be followed using real-time infrared spectroscopy (RTIR). Employing this method for monitoring polymerization of epoxides, the decrease of the epoxide absorption at 763 cm$^{-1}$ was followed as a function of time at low light intensities (1500 mJ cm$^{-2}$ min$^{-1}$). For polymerization of 1-propenoxy ether monomers, the disappearance of the band at 1670 cm$^{-1}$ due to the 1-propenoxy group was monitored.

The effect of varying the reaction time for the modification of colloidal silica with 2-(3,4-epoxycyclohexyl) ethyltrimethoxysilane was determined using RTIR. Reactions times of 2 hours and 4 hours were evaluated. It was found that both samples displayed very high polymerization rates, with little difference between the two; therefore, a 2 hour reaction period is sufficient for modification of the colloidal silica.

The effect of variation in the amount of the trialkoxysilane coupling agent 2-(3,4-epoxycyclohexyl) ethyltrimethoxysilane used to modify the colloidal silica was also examined by RTIR. Doubling the amount of the silane coupling agent from 1.0 g to 2.0 g gave very similar polymerization curves for both modified colloidal silicas.

What is claimed is:

1. A surface-modified colloidal silica comprising a finely divided silica particle to which is covalently bonded an epoxy- or 1-propenylether residue derived from an alkoxysilane chosen from the group consisting of:

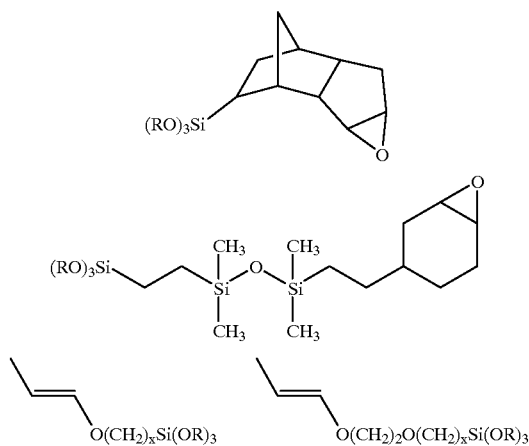

wherein x=1 to 8, and R is methyl or ethyl.

2. A surface-modified colloidal silica according to claim 1, wherein the residue bound to the surface of a silica particle is derived from an alkoxy silane chosen from the group consisting of 5,6-epoxyhexyltrimethoxysilane, 1,1,3,3-tetramethyl-1-(2-trimethoxysilyl) ethyl-3-(2-(3,4-epoxy) cyclohexyl)ethyl disiloxane) and 1-(1-propenoxy)-2-(2-(trimethoxysilyl)ethoxy)-ethane.

3. A composition comprising a surface-modified colloidal silica according to claim 1, in the form of an aqueous dispersion.

4. A composition according to claim 3, wherein the aqueous dispersion is acidic.

5. A surface-modified silica according to claim 1, wherein the particle size of the colloidal silica ranges from 5 to 200 nanometers.

6. A process for the preparation of an epoxy- or 1-alkenyl ether-functional colloidal silica, comprising the steps of:
   (a) mixing a colloidal silica, an epoxy- or 1-alkenyl ether-functional-trialkoxysilane and an ion-exchange resin;
   (b) allowing said epoxy- or 1-alkenyl ether-functional-trialkoxysilane to react with said colloidal silica; and
   (c) removing said ion-exchange resin.

7. A process according to claim 6, wherein a water-miscible solvent is added to the mixture before the ion-exchange resin is removed.

8. A process according to claim 7, wherein the solvent is isopropyl alcohol.

9. A process according to claim 6, wherein the ion-exchange resin contains a quaternary ammonium functionality.

10. A photocurable composition comprising a surface-modified colloidal silica according to claim 1 and a multifunctional epoxy- or 1-alkenyl ether monomer.

11. A composition according to claim 10, wherein the multifunctional monomer contains epoxy functionality.

12. A composition according to claim 10, wherein the multifunctional monomer contains 1-alkenyl ether functionality.

13. A composition according to claim 10, wherein the multifunctional monomer is chosen from the group consisting of: 1,2-epoxy octane, 1,2-epoxydecane, 1,2,13,14-tetradecane diepoxide, 1,2,7,8-octane diepoxide, epichlorohydrin, limonene dioxide, α-pinene oxide, dicyclopentadiene dioxide, 4-vinylcyclohexene dioxide, 3,4-epoxycyclohexylmethyl-3',4'-epoxycyclohexenecarboxylate, cyclopentene oxide, cyclohexene oxide, cycloheptene oxide, cyclooctene oxide, 1,2,5,6-cyclooctadiene dioxide; butanediol diglycidyl ether, bisphenol-A-diglycidyl ether, bisphenol-A-extended glycidyl ethers, phenol-formaldehyde glycidyl ethers, cresol-formaldehyde glycidyl ethers; diglycidyl phthalate; epoxidized linseed oil, epoxidized soybean oil, epoxidized safflower oil, epoxidized sunflower oil, epoxidized rapeseed oil, epoxidized canola oil; silicone epoxy resins; epoxidized polybutadiene, epoxidized polyisoprene and epoxidized polystyrene-co-butadiene.

14. A composition according to claim 10, comprising, by weight:
   (a) 100 parts epoxy- or 1-alkenyl ether-functional silica; and
   (b) 1 to 400 parts multifunctional monomer.

15. A composition according to claim 10, additionally comprising a polymerization initiator.

16. A composition according to claim 15, wherein the polymerization initiator is a cationic photoinitiator.

17. A polymer composite comprising a crosslinked silica-reinforced epoxy or 1-alkenyl ether resin wherein finely divided silica particles according to claim 1 are covalently bonded to the resin.

18. A method for producing composites comprising the steps of:
   (a) preparing a surface-modified colloidal silica according to claim 1 by the process of claim 6;
   (b) adding a multifunctional epoxy- or 1-alkenyl ether monomer;
   (c) adding a polymerization initiator;
   (d) applying said surface-modified colloidal silica, said multifunctional epoxy- or 1-alkenyl ether monomer and said polymerization initiator to a substrate; and
   (e) curing said surface-modified colloidal silica and said multifunctional epoxy- or 1-alkenyl ether monomer, by exposure to heat or radiation.

19. A method according to claim 18, wherein curing is accomplished by exposure to ultraviolet radiation.

* * * * *